United States Patent
Lee et al.

(10) Patent No.: US 8,972,413 B2
(45) Date of Patent: Mar. 3, 2015

(54) SYSTEM AND METHOD FOR MATCHING COMMENT DATA TO TEXT DATA

(75) Inventors: Hyun Chul Lee, Thornhill (CA); Liqin Xu, Markham (CA); Ke Zeng, Toronto (CA)

(73) Assignee: Rogers Communications Inc., Toronto (CA)

( * ) Notice: Subject to any disclaimer, the term of this patent is extended or adjusted under 35 U.S.C. 154(b) by 692 days.

(21) Appl. No.: 13/253,157

(22) Filed: Oct. 5, 2011

(65) Prior Publication Data

US 2012/0330968 A1 Dec. 27, 2012

Related U.S. Application Data

(60) Provisional application No. 61/500,116, filed on Jun. 22, 2011.

(51) Int. Cl.
*G06F 7/04* (2006.01)
*G06F 17/30* (2006.01)
*G06F 17/24* (2006.01)

(52) U.S. Cl.
CPC ........ *G06F 17/30722* (2013.01); *G06F 17/241* (2013.01); *G06F 17/30342* (2013.01); *G06F 17/30616* (2013.01); *G06F 17/30011* (2013.01); *G06F 17/30864* (2013.01)
USPC ............ 707/748; 707/750; 707/754; 707/755

(58) Field of Classification Search
CPC ............ G06F 17/30864; G06F 17/241; G06F 17/30011; G06F 17/30342; G06F 17/30616
See application file for complete search history.

(56) References Cited

U.S. PATENT DOCUMENTS

| | | | |
|---|---|---|---|
| 6,810,404 B1 | 10/2004 | Ferguson et al. | |
| 2003/0020749 A1 | 1/2003 | Abu-Hakima | |
| 2009/0043814 A1* | 2/2009 | Faris et al. | 707/104.1 |
| 2009/0287642 A1* | 11/2009 | Poteet et al. | 707/3 |
| 2010/0162093 A1 | 6/2010 | Cierniak | |
| 2010/0241507 A1* | 9/2010 | Quinn et al. | 705/14.42 |
| 2010/0306307 A1 | 12/2010 | Baessler et al. | |
| 2014/0108921 A1* | 4/2014 | Chen et al. | 715/236 |

OTHER PUBLICATIONS

PCT International Search Report and Written Opinion relating to application No. PCT/CA2011/050628 dated Jan. 26, 2012.

* cited by examiner

*Primary Examiner* — Bruce Moser
(74) *Attorney, Agent, or Firm* — Rowand LLP

(57) ABSTRACT

Methods and comment association systems for associating one or more comments with one or more primary electronic documents are described. In one aspect, the method comprises: identifying, at a comment association system, one or more key terms from at least a portion of the one or more primary electronic documents; identifying, at the comment association system, one or more comments associated with the identified key terms; determining, at the comment association system, whether an identified comment is sufficiently related to the one or more primary electronic documents by calculating one or more relation score for that identified comment and comparing the relation score to one or more threshold; and if the identified comment is sufficiently related to the one or more primary electronic documents, then associating the identified comment with the one or more primary electronic documents at the comment association system.

28 Claims, 12 Drawing Sheets

SYSTEM AND METHOD FOR MATCHING COMMENT DATA TO TEXT DATA

CROSS-REFERENCE TO RELATED APPLICATION

This application claims the benefit of and priority to U.S. Provisional Patent Application No. 61/500,116 filed Jun. 22, 2011 under the title SYSTEM AND METHOD FOR MATCHING MICROBLOGGING DATA TO TEXT DATA.

The content of the above patent application is hereby expressly incorporated by reference into the detailed description hereof.

TECHNICAL FIELD

The present disclosure relates generally to document grouping. More specifically, it relates to a method and system for automatically associating comments data with related text data.

BACKGROUND

Traditional media sources such as newspaper, television and radio now coexist with non-traditional media sources, such as micro-blogs including Twitter™. Due to the growing use of non-traditional media sources by users, such sources may provide information which may be more current than the information provided by non-traditional media sources. However, readers often turn to traditional media sources as their primary source of news content.

Thus, both non-traditional and traditional media sources may play a role in news gathering and delivery. Both traditional and non-traditional news sources may be used either gather and/or deliver news.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

Figure 1:
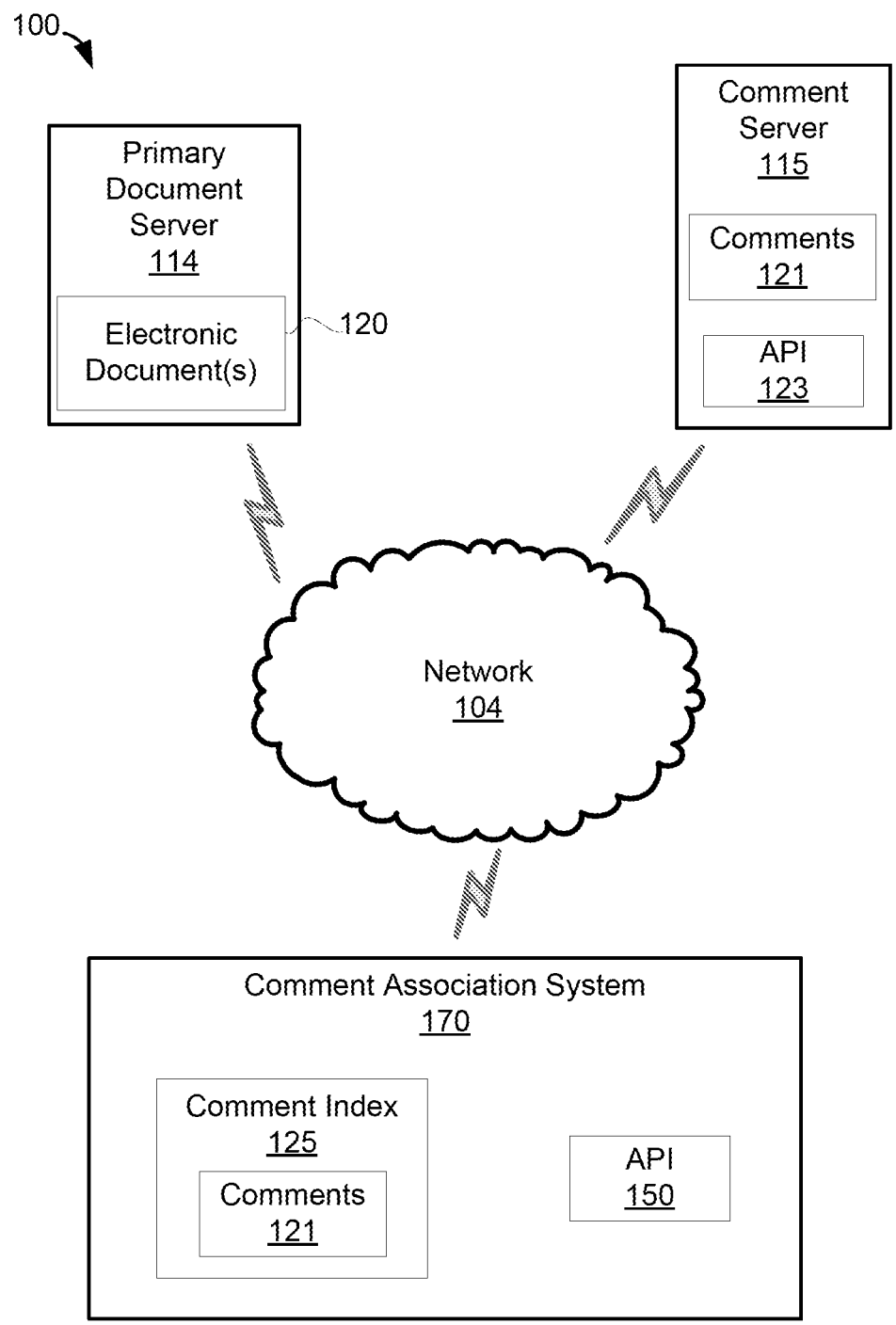
FIG. 1 shows a system diagram illustrating a possible environment in which embodiments of the present application may operate.

In one aspect, the present disclosure provides a method of associating one or more comments with one or more primary electronic documents. The method comprises: identifying, at a comment association system, one or more key terms from at least a portion of the one or more primary electronic documents; identifying, at the comment association system, one or more comments associated with the identified key terms; determining, at the comment association system, whether an identified comment is sufficiently related to the one or more primary electronic documents by calculating one or more relation score for that identified comment and comparing the relation score to one or more threshold; and if the identified comment is sufficiently related to the one or more primary electronic documents, then associating the identified comment with the one or more primary electronic documents at the comment association system.

In a further aspect, the present disclosure provides a comment association system for associating one or more comments with one or more primary electronic documents. The comment association system comprises a processor and a memory coupled to the processor. The memory stores processor executable instructions which, when executed by the processor cause the processor to: identify one or more key terms from at least a portion of the one or more primary electronic documents; identify one or more comments associated with the identified key terms; determine whether an identified comment is sufficiently related to the one or more primary electronic documents by calculating one or more relation score for that identified comment and comparing the relation score to one or more threshold; and if the identified comment is sufficiently related to the one or more primary electronic documents, then associating the identified comment with the one or more primary electronic documents.

In yet another aspect, the present disclosure describes a computer readable storage medium comprising computer executable instructions for: identifying, at a comment association system, one or more key terms from at least a portion of the one or more primary electronic documents; identifying, at the comment association system, one or more comments associated with the identified key terms; determining, at the comment association system, whether an identified comment is sufficiently related to the one or more primary electronic documents by calculating one or more relation score for that identified comment and comparing the relation score to one or more threshold; and if the identified comment is sufficiently related to the one or more primary electronic documents, then associating the identified comment with the one or more primary electronic documents at the comment association system.

Other aspects and features of the present application will become apparent to those ordinarily skilled in the art upon review of the following description of specific embodiments of the application in conjunction with the accompanying figures.

Sample Operating Environment

Reference is first made to FIG. 1, which illustrates a system diagram of a possible operating environment 100 in which embodiments of the present disclosure may operate.

In the embodiment of FIG. 1, a comment association system 170 is illustrated. The comment association system 170 is configured to analyze at least a portion of one or more machine readable documents, such as primary electronic documents 120, and to find comments which are related to the primary electronic documents 120. The comment association system 170 associates one or more primary electronic documents 120 with comments 121 which are related to those primary electronic documents 120.

In at least some embodiments, the primary electronic documents 120 may be stored on one or more primary document server 114. The primary document server 114 may be connected to the comment association system 170 via a network 104, such as the Internet. In some embodiments, the primary document servers 114 may be publicly and/or privately accessible web-sites which may be identified by a unique Uniform Resource Locator ("URL").

The network 104 may be a public or private network, or a combination thereof. The network 104 may be comprised of a Wireless Wide Area Network (WWAN), A Wireless Local Area Network (WLAN), the Internet, a Local Area Network (LAN), or any combination of these network types. Other types of networks are also possible and are contemplated by the present disclosure.

The primary electronic documents 120 may, for example, be news related documents such as one or more article or story. The news-related documents may contain information about recent and/or important events. In at least some embodiments, the primary document server 114 is operated by a news organization such as a newspaper. Where the primary electronic documents 120 are new-related documents, the comment association system 170 may be configured to find comments which are related to the same story as one or more of the primary electronic documents 120. For example, where the story relates to an event, the comment association system 170 may be configured to locate comments which are related to the same event.

The primary electronic documents 120 may be text-based documents. That is, the primary electronic documents 120 may contain data in written form. By way of example and not limitation, the primary electronic documents 120 may be formatted in a Hyper-Text Markup Language ("HTML") format, a plain-text format, a portable document format ("PDF"), or in any other format which is capable of representing text or other content. Other document formats are also possible.

In at least some embodiments, the primary electronic documents 120 are not text-based documents. Instead, the primary electronic documents 120 may be documents which are capable of being converted to text based documents. Such documents may include, for example, video or audio files. In such embodiments, the comment association system 170, or another system, may include a text extraction module which is configured to convert audible speech into written text. Such text may then be analyzed according to the methods described below in order to associate the primary electronic documents 120 with comments 121.

The comments 121 may, in various embodiments, be one or more of micro-blog posts, such as Twitter™ posts, social networking posts including status updates, such as Facebook™ posts and updates and/or Google™ Buzz™ posts and updates, user-generated comments from web-pages such as, for example, Youtube™ comments, etc. Other types of comments 121 may also be used.

The comments 121 are, in at least some example embodiments, restricted length posts. That is, the comments may be short text-based posts. In at least some embodiments, the comments 121 are less than one thousand (1000) characters. In at least some embodiments, (such as embodiments where the micro-blog posts are Twitter™ posts), the comments may be up to one hundred and forty (140) characters.

In at least some embodiments, the comments may be stored on one or more comment server 115. The comment server 115 may be accessible through a network 104, such as the Internet. In some embodiments, the comment server 115 may be publicly and/or privately accessible web-sites which may be identified by a unique Uniform Resource Locator ("URL"). The comment server 115 may receive the comments 121 from one or more users and may store such comments in a local or remote storage associated with the comment server 115. In at least some embodiments, the comment server 115 may be operated or controlled by a comment service provider. The comment service provider may, for example, be Twitter™ (e.g. where the comments 121 are Twitter™ posts), Google™ (e.g. where the comments 121 are Google™ Buzz™ posts), Facebook™ (e.g. where the comments 121 are Facebook™ posts), Youtube™ (e.g. where the comments 121 are Youtube™ posts). In other embodiments, the comment service provider may be another service providers not specifically listed above.

In at least some embodiments, the comment server 115 may include an comment application programming interface (API) 123. The comment API 123 may be configured to provide comments 121 associated with the comment server 115 to other modules and/or systems, such as the comment association system 170. In at least some embodiments, the comment API 123 may be configured to receive a request for comments from the comment association system 170 (or another system) and, in response retrieve one or more comments 121 from storage and provide the retrieved comments 121 to the comment association system 170 (or other system from which a request was received).

While in some embodiments, the comment server 115 may be configured to return comments in response to a request, in other embodiments, the comment server 115 may provide comments to the comment association system 170 when other criteria is satisfied. For example, the comment server 115 may, in at least some embodiments, be configured to periodically provide comments to the comment association system 170. For example, the comment server 115 may periodically send to the comment association system 170 any comments which have been posted since the comment server 115 last sent comments to the comment association system 170.

In at least some embodiments, the comment association system 170 may be configured to maintain a comment index 125 which indexes comments 121. That is, the comment association system 170 may receive comments 121 from the comment server 115 (i.e. via the API 123) and may store such comments in a data store associated with the comment association system 170. In at least some embodiments, the comment association system 170 may index the received comments based on the terms contained in the comments. That is, the comment association system 170 may create a comment index 125 and store the comment index in the data store associated with the comment association system 170. By indexing the comments by the terms contained therein, the comment association system 170 may easily retrieve any comments that contain a specified term.

In at least some embodiments, the comment association system 170 may analyze at least a portion of one or more primary electronic documents 120 (such as primary electronic documents 120 received from a primary document server 114) and may identify comments 121 (such as the comments received from the comment server 115) which are related to the same subject matter as the primary electronic documents 120.

In at least some embodiments, functions or features provided by the comment association system 170 may be accessed by one or more other systems or subsystems via an application programming interface (API) 150 provided by the comment association system 170. The comment association system API 150 may, for example, receive function calls from other systems. The function calls may, for example, be received from a content server which provides public or private access to one or more primary electronic documents 120 via the network 104. In some embodiments, the content server may be the primary document server 114. The content server may, for example, be a news content server which allows computers which are connected to the network 104 to view news content, such as news articles, through an Internet browser. The content server may, for example, be configured to send information regarding a primary electronic document 120 to the content association system 170. The information regarding the primary electronic document 120 may, for example, be the complete primary document, a portion thereof (such as the title of the primary electronic document 120) and/or the location of the primary document (in which case the comment association system 170 may be configured to retrieve the primary electronic document 120 or a portion thereof). The information regarding the primary document 120 may be provided as a parameter in the function call to the API 150.

The API 150 may be configured to return, to the system or subsystem from which the function call was received (e.g. the content server), one or more comments 121 (or identifying information regarding the location where such comments are located) which are determined by the comment association system 170 to be related to the primary electronic document 120. In at least some embodiments, a content server which receives the comments 121 which are related to a primary electronic document 120 (or the identifying information regarding the location where the comments are located) may be configured to display at least some of the comments 121 in a display screen which also includes the primary electronic document 120, or a portion thereof. For example, the content server may include both the primary electronic document 120 (or a portion thereof) and related comments 121 in a common webpage, which may be viewed on computers connected to the network 104.

The comment association system 170 may include functionality in addition to the ability to associate comments 121 with primary electronic documents 120. For example, in at least some embodiments, the comment association system 170 may include a primary document aggregation system (not shown), such as a news aggregation system. A primary document aggregation system creates groups of primary electronic documents 120 which have related content. For example, a news aggregation system may search for and group together news stories regarding a common event. Such news stories may be obtained by the news aggregation system from a plurality of primary document servers 114. For example, various news organizations may each operate their own primary document server 114. The news aggregation system may associate news documents from a plurality of primary document servers 114 with one another if those news documents are related to a common subject. In at least some embodiments, the document aggregation server may be of the type described in United States Publication Number 2011/0093464 A1 which was filed Aug. 17, 2010 and entitled "SYSTEM AND METHOD FOR GROUPING MULTIPLE STREAMS OF DATA," the contents of which are incorporated herein by reference.

In at least some embodiments, the content association system 170 also includes a web-interface subsystem (not shown) for automatically generating web pages which permit access to the primary electronic documents 120 on the primary document servers 114 and/or provide other information about the primary electronic documents 120. The other information may include a machine-generated summary of the contents of the primary electronic document 120, and a rank of the subject matter of the primary electronic document 120 as determined by a ranking system. The web pages which are generated by the web-interface subsystem may display primary electronic documents 120 in groups determined by the document aggregation system. In at least some embodiments, the comment association system 170 is configured to generate web pages which relate one or more primary electronic documents 120 to comments 121 which are determined by the comment association system 170 to be related to those primary electronic documents 120. For example, in some embodiments, the comment association system 170 is configured to generate web pages which include both information about one or more related primary electronic documents 170 and also information about comments 121 which are related to those primary electronic documents 120.

The comment association system 170 may in various embodiments, include more or less subsystems and/or functions than are discussed herein. It will also be appreciated that the functions provided by any set of systems or subsystems may be provided by a single system and that these functions are not, necessarily, logically or physically separated into different subsystems.

Furthermore, while FIG. 1 illustrates one possible operating environment 100 in which the comment association system 170 may operate, it will be appreciated that the comment association system 170 may be employed in any system in which it may be useful to employ a machine in order to associate one or more related primary electronic documents 120 with comments 121 which relate to the same subject matter.

Accordingly, the term comment association system 170, as used herein, includes standalone comment association systems which are not, necessarily, part of a larger system, and also comment association systems which are part of a larger system. The term comment association system 170 is, therefore, includes any systems in which the comment association methods described herein are included.

Example Comment Association System

Figure 2:
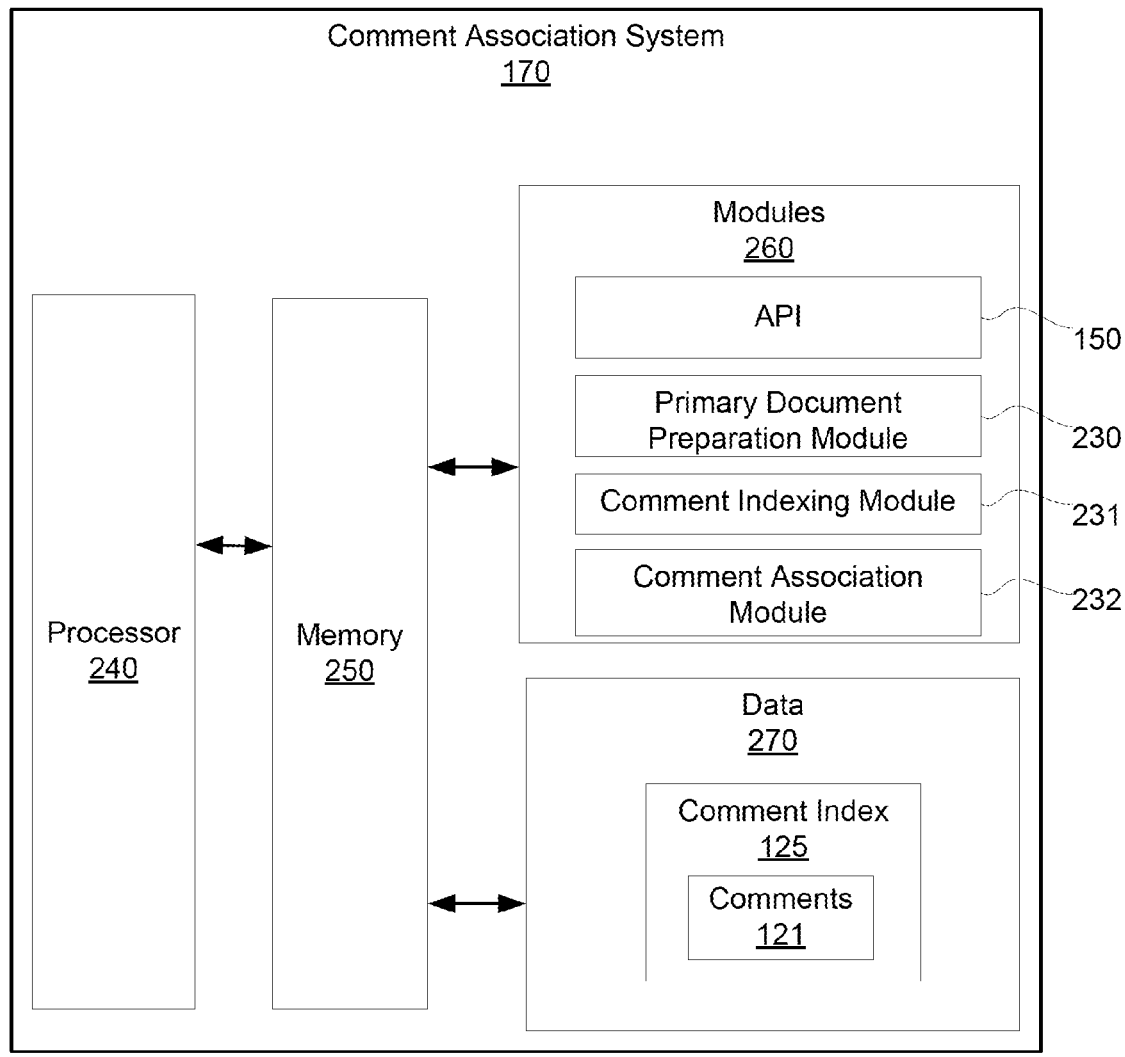
FIG. 2 shows a block diagram of a comment association system in accordance with an embodiment of the present disclosure.

Referring now to FIG. 2, a block diagram of an example comment association system 170 is illustrated. The comment association system 170 includes a controller, comprising one or more processor 240 which controls the overall operation of the comment association system 170. The comment association system 170 includes a memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), a Solid State Drive (SSD), Flash Memory, or other types of memory. It will be appreciated that each of the various memory types will be best suited for different purposes and applications.

The processor 240 may operate under stored program control and may execute software modules 260 stored on the memory 250. The modules 260 may include one or more module which provides the functions and features of the API 150. As noted above, the API 150 permits other systems or subsystems to access functions or features provided by the comment association system 170. For example, in at least some embodiments, the API 150 permits other systems or subsystems to access features which are provided by software on the comment association system 170. In at least some embodiments, the API 150 permits other systems or subsystems to request the comment association system 170 to provide comments which are related to one or more specified primary electronic documents 120. The API 150 may be configured to allow other systems, subsystems, or modules to access features provided by one or more module 260, such as, for example, a primary document preparation module 230, a comment indexing module 231, and/or a comment association module 232.

In at least some embodiments, the API 150 may be configured to receive a function call from another system, subsystem and/or module. The function call may specify one or more primary electronic documents 120 which are to be used in order to find comments 121 from one or more comment server 115 which are related to those primary electronic documents 120. For example, in at least some embodiments, the API 150 may be configured to receive, as a parameter in the function call, one or more primary electronic documents 120 or a portion thereof. Similarly, in at least some embodiments, the API 150 may be configured to receive, as a parameter in the function call, information specifying the location of one or more primary electronic document 120 or the location of a portion thereof. Where the API 150 receives the location of a primary electronic document, one or more module 260 associated with the comment association system 170 may retrieve the primary electronic document 120 at the specified location.

In at least some embodiments, the comment association system 170 may include a primary document preparation module 230. The primary document preparation module 230 may, for example, be configured to prepare primary electronic documents 120 for analysis by the comment association module 232. In at least some example embodiments, the primary document preparation module 230 is configured to extract at least some information from one or more related primary electronic documents 120 so that such information may be used to associate comments with primary electronic documents 120. In at least some embodiments, the primary document preparation module 230 is configured to obtain one or more related snippets from one or more related primary electronic documents 120.

The snippets, in at least some example embodiments, are text based snippets which may be extracted from the primary electronic documents 120. In at least some embodiments, a snippet may be a set of contiguous text which is extracted from a primary electronic document 120. The snippets may include information which is representative of the subject matter of the primary electronic document from which that snippet is extracted. That is, a snippet is a representative portion of the text of a primary electronic document 120.

In at least some embodiments, a snippet may be a title associated with a primary electronic document 120. In such embodiments, the primary document preparation module 230 may be configured to extract a title from the primary electronic document 120. As will be described in greater detail below, the extracted title (or other snippet) may be used to identify any comments 121 which are related to a primary electronic document 120 or a set of related primary electronic documents 120.

Methods by which the primary document preparation module 230 may obtain a snippet or a group of related snippets are discussed in greater detail below with reference to 303 of FIG. 3.

The comment association system 170 may include a comment association module 232. The comment association module 232 is configured to find comments 121 which are related to a primary electronic document 120 or a set of related primary electronic documents 120 (i.e. a group of primary electronic documents 120 which are related to a common subject). In at least some embodiments, the comment association system 170 is configured to perform an analysis on a snippet or a set of related snippets.

To find comments which are associated with a primary electronic document or a set of related primary electronic documents, the comment association module 232 may extract one or more key terms from at least a portion of the primary electronic document or the set of related primary electronic documents. For example, the comment association module 232 may extract key words or key phrases from a snippet or a set of related snippets. The comment association module 232 may then identify one or more comments 121 which are associated with the same key terms. The resulting set of comments may then be validated. That is, the comment association module 232 may determine whether the identified comments are sufficiently related to the primary electronic document (or the set of related primary electronic documents) by calculating one or more relation score for those comments and comparing the relation score to a threshold. The relation score may be a measure of the degree of similarity between a comment 121 and a primary electronic document 120 or set of related primary electronic documents 120. If an identified comment is sufficiently related to the one or more primary electronic documents (i.e. if the relation score between the comment and the primary electronic document exceeds a threshold), then the comment association module 232 may associate the comment with the primary electronic document 120. In at least some embodiments, the API 150 may return one or more of the comments which have been determined to be sufficiently related to a primary electronic document or a set of primary electronic documents to a system, subsystem or module which placed a function call to the API 150. In at least some embodiments, the API 150 may return a location where such comments may be found. The comment association module 232 will be discussed in greater detail below with reference to FIGS. 3 to 12.

In at least some embodiments, the memory 250 of the comment association system 170 may store data 270, which may include a comment index 125 indexing one or more comments 121. As noted above with reference to FIG. 1, in at least some embodiments, the comment association system 170 may be configured to maintain a comment index 125 of comments 121. In at least some embodiments, the modules 260 may include one or more comment indexing module 231 which may be configured to create and/or maintain the comment index 125. The comment indexing module 231 may, for example, receive comments 121 from one or more comment servers 115 (FIG. 1) and may store such comments in a data store associated with the comment association system 170 (such as the data 270 area of the memory 250). In at least some embodiments, the comment indexing module 231 may be configured to index the received comments based on the terms contained in the comments. That is, the comment indexing module 231 may create a comment index 125 and store the comment index in the data store associated with the comment association system 170. By indexing the comments by the terms contained therein, the comment association system 170 may easily retrieve any comments that contain a specified term.

The memory 250 may also store other data 270 not specifically referred to above.

The comment association system 170 may be comprised of other features, components, or subsystems apart from those specifically discussed herein. By way of example and not limitation, the comment association system 170 will include a power subsystem which interfaces with a power source, for providing electrical power to the comment association system 170 and its components. By way of further example, the comment association system 170 may include a display subsystem for interfacing with a display, such as a computer monitor and, in at least some embodiments, an input subsystem for interfacing with an input device. The input device may, for example, include an alphanumeric input device, such as a computer keyboard and/or a navigational input device, such as a mouse.

It will also be appreciated that the modules 260 may be logically or physically organized in a manner that is different from the manner illustrated in FIG. 2. By way of example, in some embodiments, two or more of the functions described with reference to two or more modules may be combined and provided by a single module. Thus, the modules 260 described with reference to FIG. 2 represent one possible assignment of features to software modules. However, such features may be organized in other ways in other embodiments.

Associating Comments with Primary Electronic Documents

Figure 3:
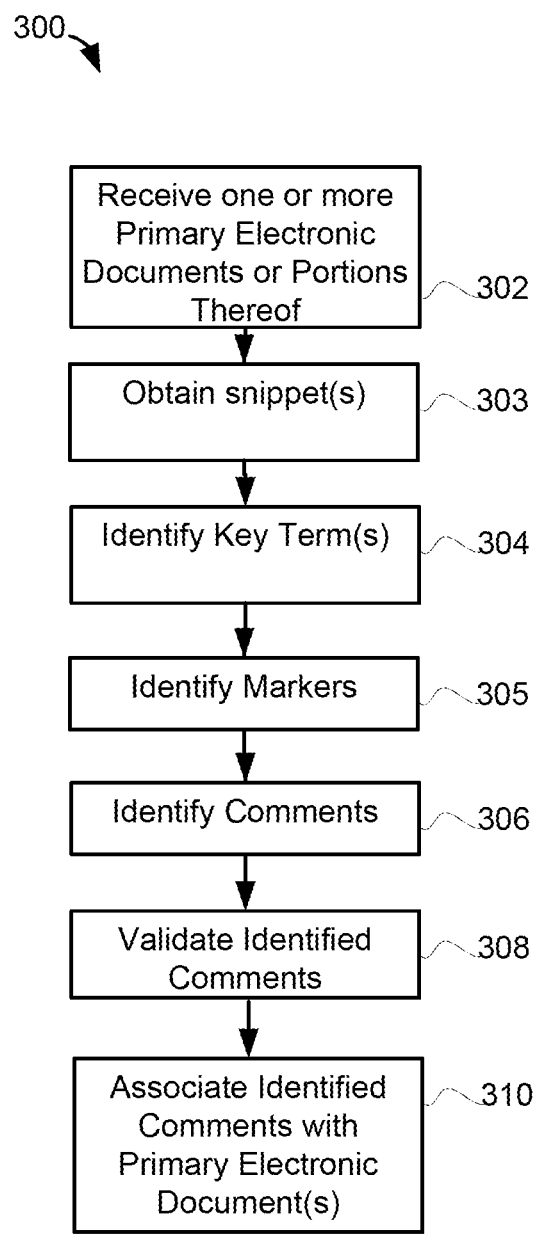
FIG. 3 is a flowchart of an example method for associating one or more comments with one or more primary electronic documents in accordance with an embodiment of the present disclosure.

Referring now to FIG. 3, a flowchart is illustrated of a method 300 for associating one or more comments 121 with one or more primary electronic documents 120. The comments 121 may originate from and be associated with a server which is different from the server where the primary electronic documents 120 originate (i.e. the comments 121 may originate from a comment server 115 and the primary electronic documents 120 may originate from a different server, which may be referred to as a primary document server 114).

The method 300 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 300 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 300 of FIG. 3.

The method 300 may include, at 302, receiving one or more primary electronic document 120, or a portion thereof. The primary electronic documents 120 (or a portion thereof) may be received from one or more primary document server 114. Primary document servers 114 store electronic documents on memory associated with such primary electronic documents. The primary electronic documents 120 may, for example, be news related documents such as one or more article or story. The news-related documents may contain information about recent and/or important events.

In at least some embodiments, at 302, the primary electronic document(s) 120, or portions thereof, are retrieved by the comment association system 170. In other embodiments, the primary electronic document 120, or portions thereof, may be provided to the comment association system 170 without a specific request made by the comment association system 170. For example, in at least some embodiments, a request for comments may be received at the comment association system 170 from another server or system via a function call to an API 150 associated with the comment association system 170. Along with the request, the other server or system may provide the primary electronic document 120 (or a portion of the primary electronic document 120) to the comment association system 170. For example, the primary electronic document 120 (or portion thereof) may be provided to the comment association system 170 as a parameter to the function call.

In at least some embodiments, at 302, the comment association system 170 may receive complete primary electronic documents 120. In other embodiments, at 302, the comment association system 170 may receive one or more portions of primary electronic documents 120. The received portions may, in some embodiments, not include the complete primary electronic document. For example, in at least some embodiments, at 302, the comment association system 170 is configured to receive one or more titles of primary electronic documents 120.

Next, at 303, in at least some embodiments, the comment association system 170 may be configured to obtain one or more related snippets for a primary electronic document 120 or a set of related primary electronic documents 120. As noted in the discussion of FIG. 2 above, the snippets are text based snippets which may be extracted from the primary electronic documents 120. That is, a snippet is a representative portion of the text of a primary electronic document.

In at least some embodiments, a snippet may be a title associated with a primary electronic document 120. The title may, for example, be a title of a news article which identifies a subject of the news article.

In at least some embodiments, the comment association system 170 may extract snippets from other portions of the document instead of or in addition to the title. For example, in at least some embodiments, the comment association system 170 may be configured to extract at least a portion of a main body of a primary electronic document 120 and to use that portion of the document to find comments that are associated with the primary electronic document 120.

In at least some embodiments, the comment association system 170 may extract a plurality of snippets from a single primary electronic document. For example, the comment association system 170 may extract a plurality of sentences from a primary electronic document 120. The plurality of sentences may be extracted from a predetermined portion of a primary electronic document 120 (i.e. at least some of the snippets may be sentences). For example, in some embodiments, the comment association system 170 may extract each sentence in the first paragraph of the body of the primary electronic document 120. Each one of these sentences may act as a snippet and they may collectively form a set of related snippets. In other embodiments, the comment association system 170 may be configured to extract the first sentence of each paragraph of the primary electronic document 120. The first sentence of each paragraph may be used as snippets for the primary electronic document 120.

Accordingly, in at least some embodiments, the comment association system 170 may be configured to, at 303, locate and extract snippets from one or more primary electronic document 120. Such snippets are extracted from one or more portions of the document which are likely to contain text which is representative of the subject matter of the primary electronic document 120. In some embodiments, the comment association system 170 may extract a single snippet from a primary electronic document 120. In other embodiments, the comment association system 170 may extract more than one snippet from a single primary electronic document 120.

The snippets which are extracted from primary electronic documents 120 may be related snippets (i.e. they may be related to one another). Where two or more snippets are extracted from a single primary electronic document, such snippets may be considered to be related by virtue of the fact that they were extracted from the same document.

In at least some embodiments, the comment association system 170 may be configured to obtain related snippets for a plurality of related documents. That is, in at least some embodiments, the comment association system 170 may be configured to obtain one or more snippets (such as titles) from one or more related documents in order to form a set of related snippets. In order to determine which primary electronic documents are related to one another, in at least some embodiments, the comment association system 170 may include one or more document aggregation modules (not shown). The document aggregation modules may perform the functions of a document aggregation system, such as a news aggregation system. More particularly, the document aggregation modules may, for example, be configured to group related primary electronic documents 120 together. The document aggregation modules may be configured to group primary electronic documents 120 which are related to the same subject matter together to form a set of related primary electronic documents 120. In at least some embodiments, the document aggregation system may be a news aggregation system which relates a plurality of news documents by related subject matter.

In some such embodiments, the comment association system 170 may be configured to obtain snippets from a group of related primary electronic documents. For example, in at least some embodiments, the comment association system 170 may extract the title from each primary electronic document in a group of related primary electronic documents 120. Since such snippets are extracted from primary electronic documents which are all related to the same subject matter, such snippets may be said to be related snippets.

Accordingly, in at least some embodiments the comment association system 170 may be configured to, at 303, obtain a plurality of related snippets. Such related snippets may be related by virtue of the fact that they are extracted from the same primary electronic document 120 or may be related by virtue of the fact that they are extracted from a plurality of related primary electronic documents 120.

In at least some embodiments, a primary document preparation module 230 (or another suitable module) associated with the comment association system 170 may be configured to cause a processor 240 associated with the comment association system 170 perform 303. More particularly, a primary document preparation module 230 may contain computer readable instructions which, when executed, cause the processor 240 to perform 303.

Accordingly, in at least some embodiments, one or more related snippets may be produced at 303. These snippets may be titles which are associated with related primary electronic documents 120 (e.g. documents which are determined by a document aggregation to be related to the same subject matter). By way of example and not limitation, the following are sample snippets which may be produced by 303:

Consumer spending up only slightly
    U.S. economy shows signs of momentum
    U.S. economic growth fastest in 6 years
    US GDP surges to 5.7 pc, led by business Next at, 304, one or more key terms may be identified and extracted from at least a portion of one or more primary electronic documents. In at least some embodiments, the one or more key terms may be extracted from the snippets obtained at 303. That is, the key terms may be extracted from a snippet or from a set of related snippets. In at least some embodiments, where the snippets are titles, the key terms may be extracted from a set of related titles.

The key terms which are identified at 304 may, in some embodiments, include one or more key words. The key words are words which are identified as being important to the subject of the snippet(s). In at least some embodiments, the comment association system 170 may select words as key words based on the frequency of occurrence of those words in the snippet(s). That is, words may be selected as key words if they occur frequently in the snippet(s).

The key terms which are identified at 304 may, in at least some embodiments, include one or more key phrases. Phrases are groups of contiguous words. Phrases may be selected as key phrases based on their frequency of occurrence in the snippet(s).

304 will be discussed in greater detail below with reference to FIGS. 4 to 7.

As will be described below, these key terms may be used to identify comments which may be related to the same subject matter as the primary electronic document(s) 120. In order to expand the list of possible comments which may be related to the same subject matter as the primary electronic document(s) 120, in at least some embodiments, at 305, the comment association system 170 may identify one or more markers which may be related to the subject matter of primary electronic document(s) 120. More particularly, the comment association system 170 may identify one or more markers which are related to the key terms (i.e. markers which are contained in comments having one or more of the key terms identified in 304).

A marker is a subject matter identifier which is used to identify the subject matter of one or more comments. In at least some embodiments, the marker may include a predetermined marker identifier which identifies the marker's status as a marker from regular text. For example, in at least some embodiments, (such as embodiments where the comments 121 are Twitter™ posts), a hash tag (#) may be used as a marker identifier to identify the subject matter of comments (such as Twitter™ posts). In such embodiments, the hash tag may directly precede text and the hash tag and its associated text may be used as a marker to add context to a comment 121.

305 will be discussed in greater detail below with reference to FIG. 8.

Next, at 306, in at least some embodiments, the comment association system 170 identifies one or more comments based on the key terms identified at 304 and/or the markers identified at 305. In at least some embodiments, at 306, the comment association system 170 identifies one or more comments 121 which are associated with the extracted key terms from 304. In some embodiments, the comment association system 170 may identify any comments which contain any one or more of the key terms identified at 304. In other embodiments, the comment association system 170 may only identify comments if they contain a predetermined number of key terms. For example, in at least some embodiments, the comment association system 170 may identify comments which contain two or more of the key terms.

The comments 121 may, in at least some embodiments, be identified at 306 by querying a comment server 115 (FIG. 1) which maintains the comments 121. That is, one or more of the key terms identified at 304 may be used as a search term to search comments 121 to identify any of the comments which contain a predetermined number of the key terms. In at least some embodiments, the predetermined number of key terms may be one.

In other embodiments, the comment association system 170 may maintain a comment index 125 which indexes comments 121. The comment index 125 may index such comments by words which are contained in those comments. In such embodiments, the comment server 115 may consult the comment index 125 to identify comments 121 which contain a predetermined number of key terms. For example, in at least some embodiments, the comment association system 170 may identify comments 121 which contain one or more key terms using the comment index 125.

The comments which are identified at 306 may, in at least some embodiments, be referred to as candidate comments. Candidate comments are comments which the comment association system 170 has determined to possibly be associated with the same subject matter as the primary electronic document(s) 120. In such embodiments, a further analysis may be performed on the candidate comments to determine whether the comments are sufficiently related to the primary electronic document(s) 120. That is, at 308, the comment association system 170 may be configured to validate the comments identified at 306.

Validating the candidate comments determines whether each of the candidate comments are sufficiently related to one or more of the primary electronic documents. The comment association system 170 may be configured to determine whether an identified comment is sufficiently related to the primary electronic document(s) by calculating one or more relation score for an identified comment and then comparing that relation score to one or more threshold. The relation score is a measure of the similarly of the subject matter of the comment to the subject matter of the primary electronic document(s).

308 will be discussed in greater detail below with reference to FIGS. 9 to 12.

If one or more candidate comments are validated (i.e. if a comment identified at 306 is determined to be sufficiently related to the primary electronic document(s)), then at 310, one or more of those comments may be associated with the primary electronic document(s). The comment association system 170 may create such an association in memory of the comment association system 170. That is, the comment association system 170 may, at 310, update its memory 250 to indicate that the validated comments are related to the primary electronic document(s).

In at least some embodiments in which the comment association system 170 was engaged by another system via an API 150, the comment association system 170 may, at 310, return the validated comment(s) or a location of the validated comment to the system which engaged the comment association system 170 via the API 150. That is, the comment association system 170 may, at 310, associate one or more validated comments with the primary electronic document 120 by identifying the one or more validated comments to the system which engaged the comment association system 170.

In at least some embodiments, at 310, the comment association system 170 may associate one or more validated comments with the primary electronic document 120 by generating a web page which identifies one or more of the primary electronic documents received at 302 and one or more of the comments validated at 308. That is, the web page may display both primary electronic documents and comments which are determined to be related to the primary electronic documents in a common web page to visually represent the relationship between the primary electronic documents and the comments.

Identification of Key Terms

Figure 4:
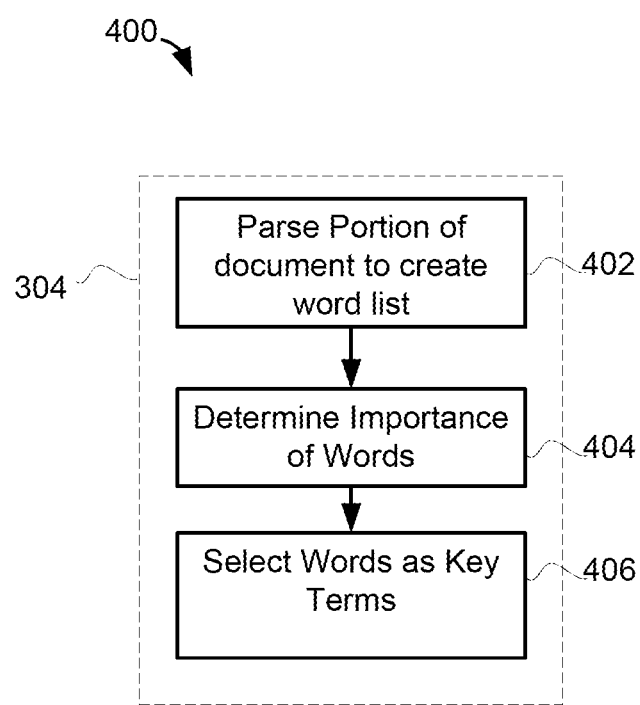
FIG. 4 is a flowchart of a method for identifying key terms in accordance with some example embodiments of the present disclosure.

Reference will now be made to FIG. 4, which illustrates a flowchart of a method 400 for identifying key terms in accordance with some example embodiments of the present disclosure. The method 400 may, in at least some embodiments, be performed at 304 of FIG. 3.

The method 400 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 400 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 400 of FIG. 4.

First, at 402, the comment association system 170 may parse at least a portion of one or more primary electronic documents 120 and may create a word list which identifies the words which are included in the parsed portions of the primary electronic documents 120. In at least some embodiments, at 402, the comment association system 170 may parse one or more related snippets, which may be obtained at 302 of FIG. 3. The one or more related snippets may, for example, be one or more titles. Where the related snippets include more than one title, the titles may relate to primary electronic documents 120 which relate to common subject matter.

Next, at 404, the comment association system 170 may determine a measure of the importance of the words identified at 402. In at least some embodiments, the comment association system 170 may determine a measure of the importance of the words in the snippets (such as the titles). In at least some embodiments, the importance of a word is determined by obtaining a Term Frequency-Inverse Document Frequency (TF-IDF) for the word. The TF-IDF is a statistical measure used to evaluate how important a term is to a document. It examines the frequency of occurrence of a term in the portion of the document (such as the snippet) relative to the frequency of that term in a larger set of documents.

The TF-IDF may be calculated by the comment association system 170. In at least some embodiments, the IDF of a term may be determined based on the British National Corpus. In at least some embodiments, the term frequency of a word may be determined by counting the number of occurrences of a word within at least a portion of one or more primary electronic documents 120. For example, in at least some embodiments, the term frequency of a term may be determined by counting the number of occurrences of the term within the related snippets obtained at 302 of FIG. 3.

Next, at 406, one or more words are selected as key terms based on the measure of importance of the words determined at 404. For example, in at least some embodiments, at 406, the comment association system 170 will order the words by importance and select a predetermined number of the most important words as key words. The predetermined number may, in at least some embodiments, depend on the number of words identified at 402.

Figure 5:
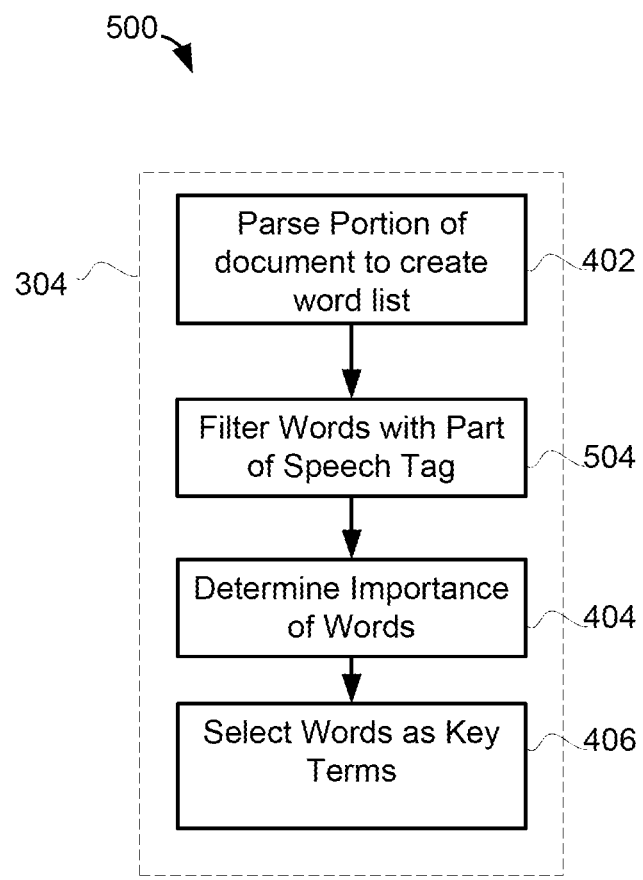
FIG. 5 is a flowchart of a method for identifying key terms in accordance with some example embodiments of the present disclosure.

In some embodiments, to eliminate words which don't generally represent the subject matter of a primary electronic document, a filtering process may be employed to remove certain types of words. Referring now to FIG. 5, a flowchart of one such method 500 for identifying key terms is illustrated. The method 500 may, in at least some embodiments, be performed at 304 of FIG. 3.

The method 500 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 500 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 500 of FIG. 5.

The method 500 of FIG. 5 may include features discussed above with reference to FIG. 4. These features 402, 404, 406 are discussed in greater detail above with reference to FIG. 4.

First, at 402, the comment association system 170 may parse at least a portion of one or more primary electronic documents 120 and may create a word list which identifies the words which are included in the parsed portions of the primary electronic documents 120.

Next, at 504, the comment association system 170 applies a filter to the words identified at 402 to filter at least some words. In the embodiment of FIG. 5, at 504, words are filtered by applying part-of-speech tagging to the words identified at 402. That is, the comment association system 170 determines a part of speech associated with the words identified at 402 and then filters the identified words based on the part of speech for the identified words. That is, words which have an unwanted part of speech are filtered out.

Part-of-speech tagging is a process of determining a part-of-speech associated with a word. That is, a word may be assigned a part-of-speech tag based on the word's definition and/or context. By way of example, part-of-speech tagging may recognize whether a word is one of: a cardinal number, a determiner, an existential there, a foreign word, a preposition or subordinating conjunction, and adjective, an adjective comparative, an adjective superlative, a list item marker, a modal, a noun (and/or the type of noun i.e. proper noun, plural, singular, etc.), a predeterminer, a possessive ending, a personal pronoun, a possessive pronoun, an adverb, an adverb comparative, an adverb superlative, a particle, a symbol, an interjection, a verb (and/or the type of verb i.e. base form, past tense, gerund, past participle, non-3rd person singular present, 3rd person singular present), a wh-deterimer, a wh-pronoun, and/or whether the word is a contains a specific type of punctuation (i.e. a numbers sign (#), a dollar sign ($), a quotation mark ("), a parenthesis, etc.). It will be appreciated that these examples are merely illustrative and that other part-of-speech tags are also possible.

In at least some embodiments, the words that are identified at 402 may be filtered at 504 to remove words which are not nouns, proper nouns, verbs, adjectives or adverbs. In other embodiments, other types of words may be filtered.

Next, at 404, the comment association system 170 may determine a measure of the importance of the words identified at 402 which have not been filtered out at 504. In at least some embodiments, the comment association system 170 determines a measure of the importance of the words identified at 402 (which are either nouns, proper nouns, verbs, adjectives or adverbs, in some embodiments). Feature 404 is discussed in greater detail above with reference to FIG. 4. However, in the embodiment of FIG. 5, at 504, the comment association system 170 ignores the words which were filtered out at 504.

Next, at 406, one or more words are selected as key terms based on the measure of importance of the words determined at 404. 406 is discussed in greater detail above with reference to FIG. 4.

Figure 6:
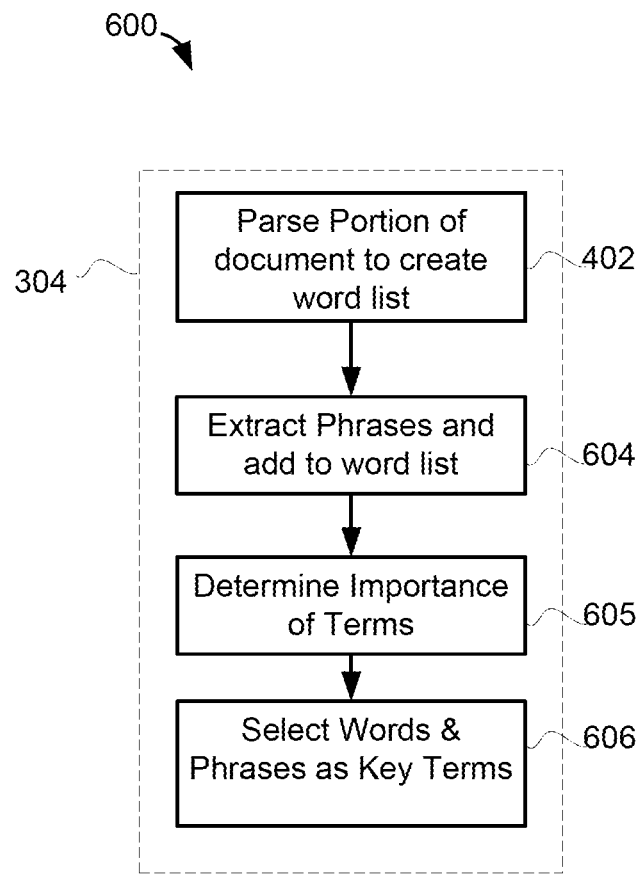
FIG. 6 is a flowchart of a method for identifying key terms in accordance with some example embodiments of the present disclosure.

In some embodiments, the key terms which are identified at 304 (FIG. 3) may include both key words and key phrases. Referring now to FIG. 6, a flowchart of one such method 600 is illustrated. The method 600 may, in at least some embodiments, be performed at 304 of FIG. 3.

The method 600 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 600 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 600 of FIG. 6.

The method of FIG. 6 may include features discussed above with reference to FIG. 4.

First, at 402, the comment association system 170 may parse at least a portion of one or more primary electronic documents 120 and may create a word list which identifies the words which are included in the parsed portions of the primary electronic documents 120. 402 is discussed in greater detail above with reference to FIG. 4.

At 604, the comment association system 170 may extract phrases from at least a portion of the primary electronic documents 120. More particularly, the comment association system 170 may parse at least a portion of the one or more primary electronic documents 120 and may create a list of phrases which are identified in those portions. In at least some embodiments, at 604, the comment association system 170 may parse one or more related snippets, which may be obtained at 302 of FIG. 3. The one or more related snippets may, for example, be one or more titles. Where the related snippets include more than one title, the titles may relate to primary electronic documents 120 which contain a common subject matter. In at least some embodiments, phrases may be extracted from the parsed portion according to the method described in United States Patent Publication Number 2011/0093414, which was filed May 7, 2010 and entitled "SYSTEM AND METHOD FOR PHRASE IDENTIFICATION," the contents of which are incorporated herein by reference.

Next, at 605, the importance of the words identified at 402 and the phrases identified at 604 may be determined. That is, the relative importance of terms is determined. In at least some embodiments, the comment association system 170 may determine the importance of the words and phrases in the snippets (such as the titles). A measure of the importance of the words and phrases may be determined as discussed above with reference to 404 of FIG. 4. More particularly, the importance of a word or phrase may be determined by obtaining a Term Frequency-Inverse Document Frequency (TF-IDF) for the words and phrases.

The TF-IDF for the words identified at 402 and the phrases identified at 604 may be calculated by the comment association system 170. In at least some embodiments, the IDF of a word may be determined based on the British National Corpus. In at least some embodiments, the IDF of a phrase may be determined by counting the number of occurrences of the phrase in a large volume of text, such as a large volume of documents.

In at least some embodiments, the term frequency of a word or phrase may be determined by counting the number of occurrences of that word or phrase within at least a portion of one or more primary electronic documents 120. For example, in at least some embodiments, the term frequency of a term may be determined by counting the number of occurrences of the term within the related snippets obtained at 302 of FIG. 3.

Next, at 606 the comment association system 170 may select words and/or phrases as key terms based on the measure of importance of the words and phrases determined at 605. For example, in at least some embodiments, at 606, the comment association system 170 will order the words and phrases by importance (e.g. based on the measure of importance) and select a predetermined number of the most important words or phrases as key terms.

Figure 7:
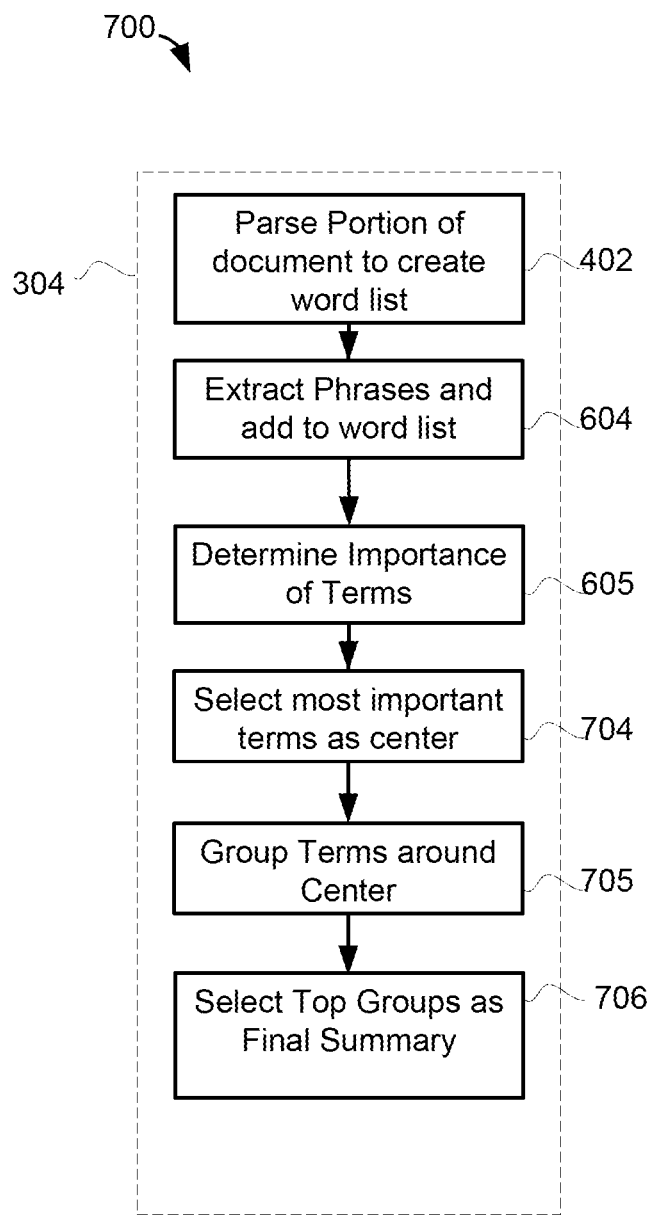
FIG. 7 is a flowchart of a method for identifying key terms in accordance with some example embodiments of the present disclosure.

Referring now to FIG. 7, a flowchart of a further method 700 for identifying key terms is illustrated. The method 700 may, in at least some embodiments, be performed at 304 of FIG. 3.

The method 700 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 700 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 700 of FIG. 7.

The method 700 of FIG. 7 may include features discussed above with reference to FIGS. 4 to 6.

First, at 402, the comment association system 170 may parse at least a portion of one or more primary electronic documents 120 and may create a word list which identifies the words which are included in the parsed portions of the primary electronic documents 120. 402 is discussed in greater detail above with reference to FIG. 4.

Next, in some embodiments, at 604, the comment association system 170 may extract phrases from at least a portion of the primary electronic documents 120. 604 is discussed in greater detail above with reference to FIG. 6.

Next, at 605, the comment association system 170 may obtain a measure of the importance of terms in the manner described above with reference to FIGS. 4 to 6.

At 704, the comment association system 170 may select one or more of the most important terms (i.e. the terms with a higher relative measure of importance than other terms) to act as center terms and may create a group for each of these center terms. In at least some embodiments, the number of terms selected may be fixed. That is, the comment association system 170 is configured to select a predetermined number of terms having the highest measures of importance. In other embodiments, the comment association system 170 may select all terms which have a measure of importance which is greater than a predetermined threshold. For example, in some embodiments, the comment association system 170 may select all terms which have a TF-IDF which is greater than a predetermined threshold.

Next, at 705, the comment association system 170 may attempt to group other terms from the word list created at 402 (and/or 604) around these center terms. That is, the comment association system 170 may add terms that have a close relation to the center term to a group which includes that center term. In at least some embodiments, this may be done by calculating a group relation measure between a center term and one of the terms in the primary electronic document which is not a center term. In one embodiments, the relation measure may be:

$$D(i, j) = \frac{C(i, j)}{C(i)},$$

where i is the center term, j in the non-center term, C(i,j) is the co-occurrency count of i and j (i.e. a measure of how often i and j are found together), and C(i) is the occurency count of item i in all snippets.

In at least some embodiments, the comment association system 170 is configured to add a term j to a group which is centered around a term i if the relation measure between these terms, D(i,j), is greater than a predetermined threshold. In at least some embodiments, the threshold may be 0.5.

In at least some embodiments, in order to ensure that every member of a group is sufficiently related to one another, before adding a term j to a group which is centered around i, the comment association system 170 will confirm that the term j is also sufficiently related to the other terms which are part of that group. That is, a further group relation measure may be determined in order to ensure that all elements of a group are closely related. For example, in at least some embodiments, the comment association system 170 will calculate a relation measure between the term j and another term, m, of the group centered around the center term i. For example, in at least some embodiments, the comment association system 170 will confirm that one or both of the following are less than one or more predetermined threshold:

$$D(m, j) = \frac{C(m, j)}{C(m)}$$

$$D(j, m) = \frac{C(j, m)}{C(j)}$$

where j is the candidate term (i.e. the term not yet added to the group), m in the non-center term which is part of the group, C(m,j) is the co-occurrency count of m and j (i.e. a measure of how often m and j are found together), C(j,m) is the co-occurrency count of j and m, and C(j) is the occurency count of item j in all snippets.

The predetermined threshold which is used to determine that the candidate term j is sufficiently related to the non-center term which is part of the group may be lower than the predetermined threshold which is used to determine whether the candidate term j is sufficiently related to the center. In at least some embodiments, the predetermined threshold which is used to determine that the candidate term j is sufficiently related to the non-center term is 0.3.

Based on the group relation measure(s) discussed above, the comment association system 170 may selectively add one or more of the terms of the primary electronic document (or snippet) which is not a center term, to a group. That is, the comment association system 170 may add the candidate term to one or more group if the comment association system 170 determines that the comment is sufficiently related to the terms in the group. As noted above, a term may be said to be sufficiently related to another term if those terms occur together frequently.

Next, at 706, a score may be calculated for each of a plurality of groups. One or more groups having a higher relative score than other groups may be selected. That is, one or more groups having the top scores may be selected. The terms in these groups may be selected as key terms.

In at least some embodiments, a group score for each group may be $$S(G_i) = \sum_{w_j \in G_i} TFIDF(j) \cdot \frac{\sum_{w_j \in G_i, m \neq j} D(j, m)}{|G_i| - 1},$$

where TFIDF(j) is the Term Frequency-Inverse Document Frequency for a term j, $G_i$ is the group centered around center term i, $|G_i|$ is the number of terms in the group centered around center term i.

In at least some embodiments, the comment association system 170 is configured to rank groups according to their score and to select a predetermined number of groups having the highest scores. The key terms in those groups may then be used in 306 of FIG. 3 in order to identify comments 121.

Expansion of Potentially Relevant Comments Using Markers

In some embodiments, after key terms are identified according to the methods 400, 500, 600, 700 of any one of FIGS. 4 to 7, those key terms may be used in order to identify comments which are potentially related to the primary electronic documents 120. In some embodiments, however, additional comments which may be potentially related to the primary electronic documents 120 may be located by examining document markers. A marker is a subject matter identifier which is used to identify the subject matter of one or more comments. In at least some embodiments, the marker may include a predetermined marker identifier which identifies the marker's status as a marker from regular text. For example, in at least some embodiments, (such as embodiments where the comments 121 are Twitter™ posts), a hash tag (#) may be used as a marker identifier to identify the subject matter of comments (such as Twitter™ posts). In such embodiments, the hash tag may directly precede text and the hash tag and its associated text may be used as a marker to add context to a comment 121.

Figure 8:
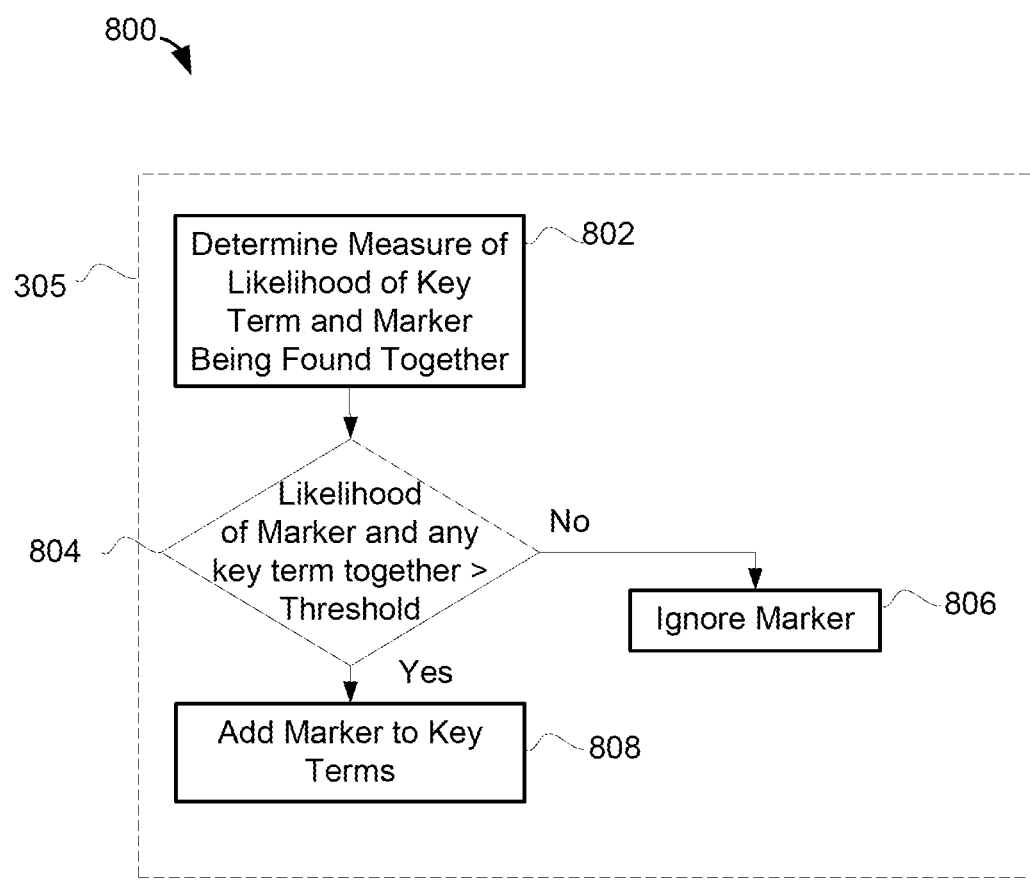
FIG. 8 is a flowchart of a method for expanding a group of comments which are potentially related to a primary electronic document.

Referring now to FIG. 8 a flowchart of a method 800 for expanding a group of comments which are potentially related to a primary electronic document 120 is illustrated. The method 800 may, in at least some embodiments, be performed at 305 of FIG. 3.

The method 800 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 800 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 800 of FIG. 8.

First, in at least some embodiments, at 802, the comment association system 170 determines a measure of the likelihood of a key term and a marker being found together in a comment. To do so, the comment association system 170 may parse a set of comments to relate terms to markers. That is, the comment association system 170 may calculate a measure of the likelihood of a key term and a marker being found together in a comment. This measure may, for example, be a probability. The measure may be determined by examining a large number of comments. In some embodiments, all comments in the comment index 125 (FIG. 2) may be parsed. In other embodiments, only a portion of the available comments may be parsed. In at least some embodiments, only the comments contain the key terms identified in 304 of FIG. 3 may be parsed.

Next, at 804, the comment association system 170 determines whether the likelihood of a marker being found in the same comment 121 as one of the key terms identified at 304 of FIG. 3 is greater than a threshold. The threshold may be a predetermined threshold. If the likelihood of the marker being found in the same comment 121 as one of the key terms is less than the threshold, then the comment association system 170 may ignore the marker (at 806). If, however, the likelihood of the marker being found in the same comment 121 as one of the key terms is greater than the threshold, then the comment association system 170 may add the marker to the key terms at 808. That is, the identified marker may be used as a key term in order to find potentially relevant comments (e.g. it may be used in 306 of FIG. 3).

Validation of Potentially Relevant Comments

In at least some embodiments, a set of potentially relevant comments may be identified (at 306 of FIG. 3) using the key terms identified (at 304 of FIGS. 3 to 7) and/or the markers identified (at 305 of FIGS. 3 and 8). In at least some embodiments, the comments in the set of potentially relevant comments may be validated to ensure that each comment in the set is sufficiently related to the primary electronic document(s) received at 302 of FIG. 3.

Figure 9:
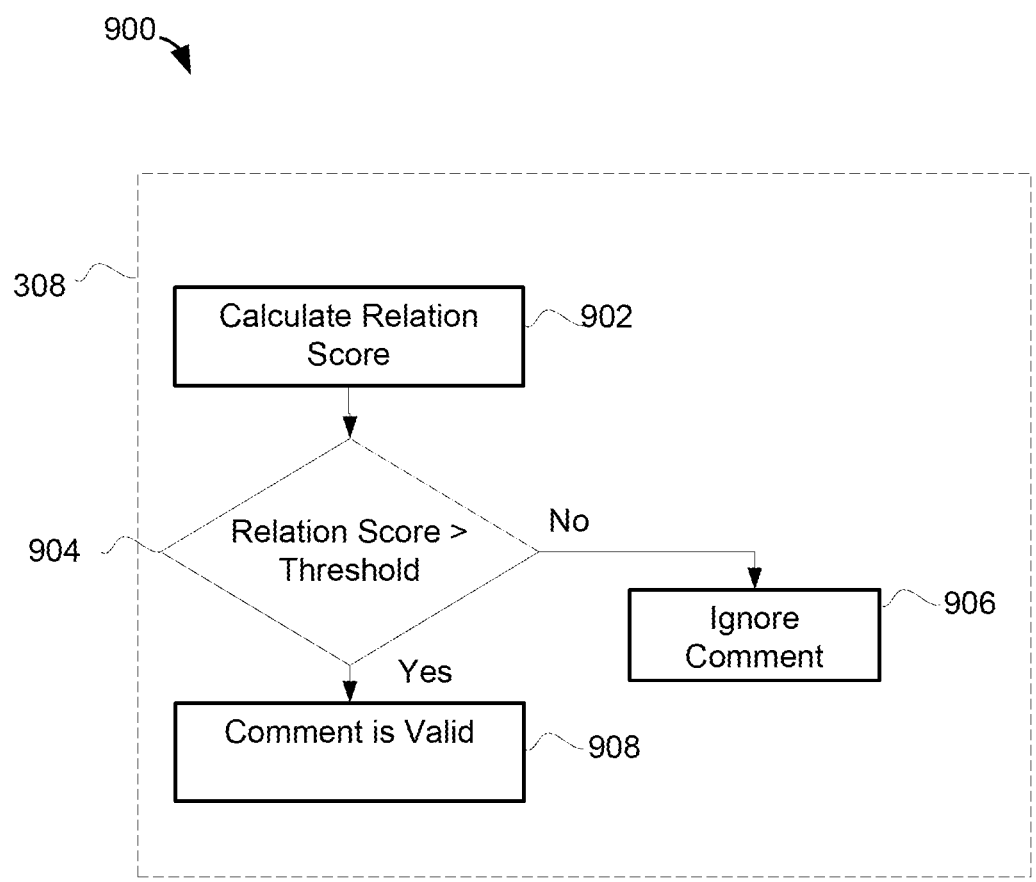
FIG. 9 is a flowchart of a method of validating potentially relevant comments in accordance with an embodiment of the present disclosure.

Referring now to FIG. 9, a method 900 of validating potentially relevant comments is illustrated in flowchart form. The method 900 may, in at least some embodiments, be performed at 308 of FIG. 3.

The method 900 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 900 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 900 of FIG. 9.

The method 900 may, in some embodiments, be performed for all comments which have been identified as being potentially relevant (i.e. all comments identified at 306 of FIG. 3). At 902, the comment association system 170 may calculate one or more relation score for each comment. The relation score is a measure of how relevant the comment is to one or more primary electronic documents 120. The relation score may be a numerical value.

Next, at 904, the relation score for a comment may be compared to a predetermined threshold. If the relation score is greater than the threshold, then the comment may be validated (at 908) and the comment association system 170 may associate the comment with the primary electronic document(s) which it has been determined to be related to (at 310 of FIG. 3). In some embodiments, if the relation score is lower than the threshold (i.e. if the comment is not sufficiently related to the primary electronic document(s)), then at 906, the comment is ignored. In least some embodiments, when the comment is ignored, it is not associated with the primary electronic document(s).

In at least some embodiments, the relation score may include a per-snippet-score. Where the snippets are titles, the per-snippet-score may be referred to as a per-title-score. The per-snippet-score is a measure of the similarly between the comment and the snippet.

Figure 10:
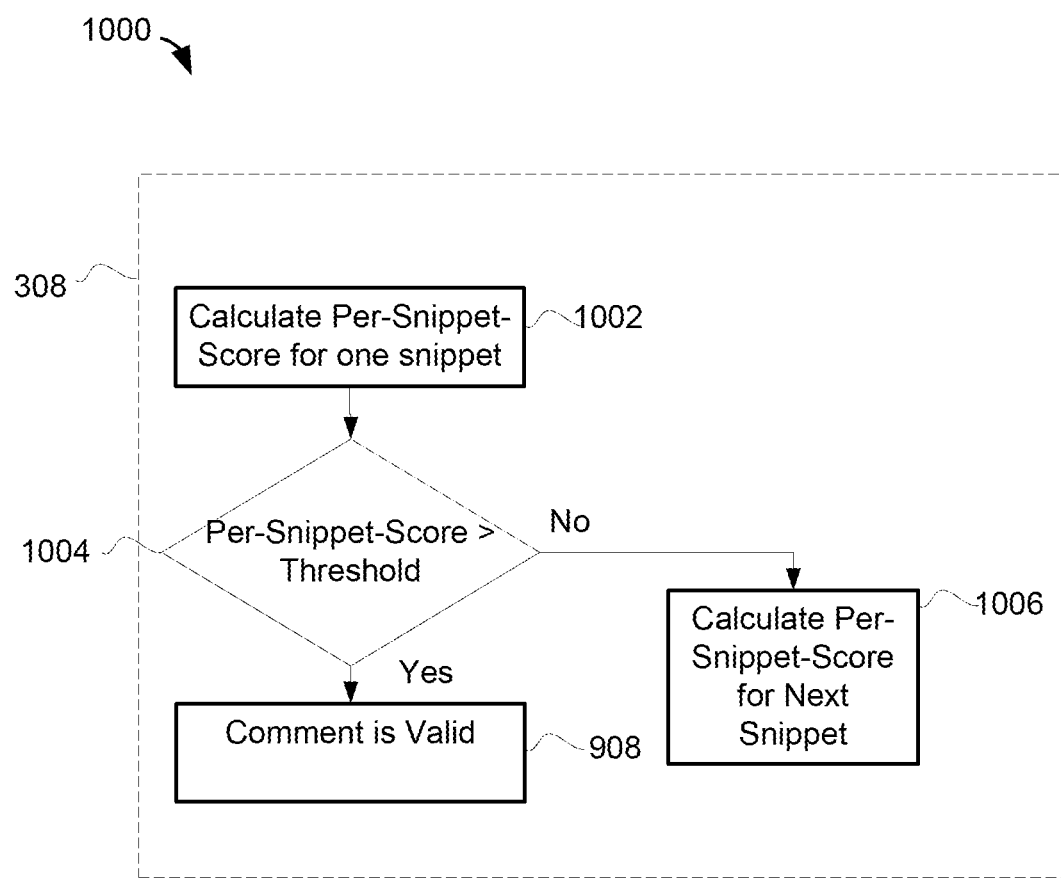
FIG. 10 is a flowchart of a method of validating potentially relevant comments in accordance with an embodiment of the present disclosure.

One such embodiment is illustrated in FIG. 10. Referring now to FIG. 10, a method 1000 of validating potentially relevant comments is illustrated in flowchart form. The method 1000 may, in at least some embodiments, be performed at 308 of FIG. 3.

The method 1000 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 1000 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 1000 of FIG. 10.

The method 1000 may, in some embodiments, be performed for all comments which have been identified as being potentially relevant (i.e. all comments identified at 306 of FIG. 3).

At 1002, the per-snippet-score may be calculated for a comment. In at least some embodiments, the per-snippet-score is a measure of the number of terms which are common to both a comment and one of the snippets. Accordingly, in at least some embodiments, at 1002 a per-snippet-score is calculated for one of the comments and one of the snippets. This may be done by counting the number of words and/or terms which are common to both the snippet and the comment.

If the number of common terms is greater than a threshold (as determined at 1004), then the comment may be determined to be valid at 908 and the comment association system 170 may associate the comment with the primary electronic document(s) which it has been determined to be related to (at 310 of FIG. 3). The threshold may, in at least some embodiments, be a predetermined threshold. The threshold may, for example, be static number, such as one (1). In other embodiments, the threshold may be variable but may be determined in accordance with a formula. The formula may, for example, specify that the threshold is dependent on the number of terms in the snippet.

In some embodiments, if the per-snippet-score for a given comment and snippet is less than the threshold (as determined at 1004), then at 1006 a per-snippet-score may be calculated for the same comment and another one of the snippets. That is, the method 1000 may be repeated for the same comment and another snippet. If there are no more snippets, then the comment association system 170 may determine that the comment is invalid. In least some embodiments, when the comment is determined to be invalid, it is not associated with the primary electronic document(s).

While FIG. 10 illustrates an embodiment in which each per-snippet-score is compared to a threshold in order to determine whether the comment is valid, in other embodiments, an average per-snippet-score may be calculated and compared with a threshold to determine whether the comment is valid. That is, for each comment, a per-snippet score may be calculated for each snippet. An average per-snippet-score may then be calculated by averaging a plurality of the per-snippet-scores for that comment. In some embodiments, all of the per-snippet-scores for that comment may be averaged. In other embodiments, only a subset of the per-snippet scores may be averaged. The subset selected for the averaging may include per-snippet-scores which have a higher relative per-snippet score than unselected per-snippet-scores. In at least some embodiments, the number of per-snippet scores which are selected for averaging may be a predetermined static number, such as ten (10). In other embodiments, the number of per-snippet-scores which are selected for averaging may be variable. For example, in at least some embodiments, the number of per-snippet-scores which are selected is a predetermined fraction of the number of snippets, such as one-tenth the number of snippets.

Furthermore, while FIG. 10 illustrates an embodiment in which the per-snippet-score is related only to the number of terms which are common to both the snippet and the comment, in other embodiments, the per-snippet-score may be based on other criteria instead of or in addition to the number of common terms. For example, in at least one example embodiment, the per-snippet-score is calculated to increase the per-snippet-score by a greater amount for common terms that are key terms than for common terms that are not key terms. That is, if a term is common to both the snippet and the comment and that term is a key term, then the per-snippet-score will be affected by a greater amount than if that term is not a key term. The per-snippet-score may value key terms more highly than non-key terms.

In some embodiments, another relation measure may be used by the comment association system 170 instead of or in addition to the per-snippet-score. In at least some embodiments, a relation measure may be used which is a measure of the number of terms in a comment which are key terms (i.e. the number of terms in the comment which are also terms which were identified as key terms in 304 of FIG. 3). This relation measure may, in some embodiments, be referred to as a key term count.

Figure 11:
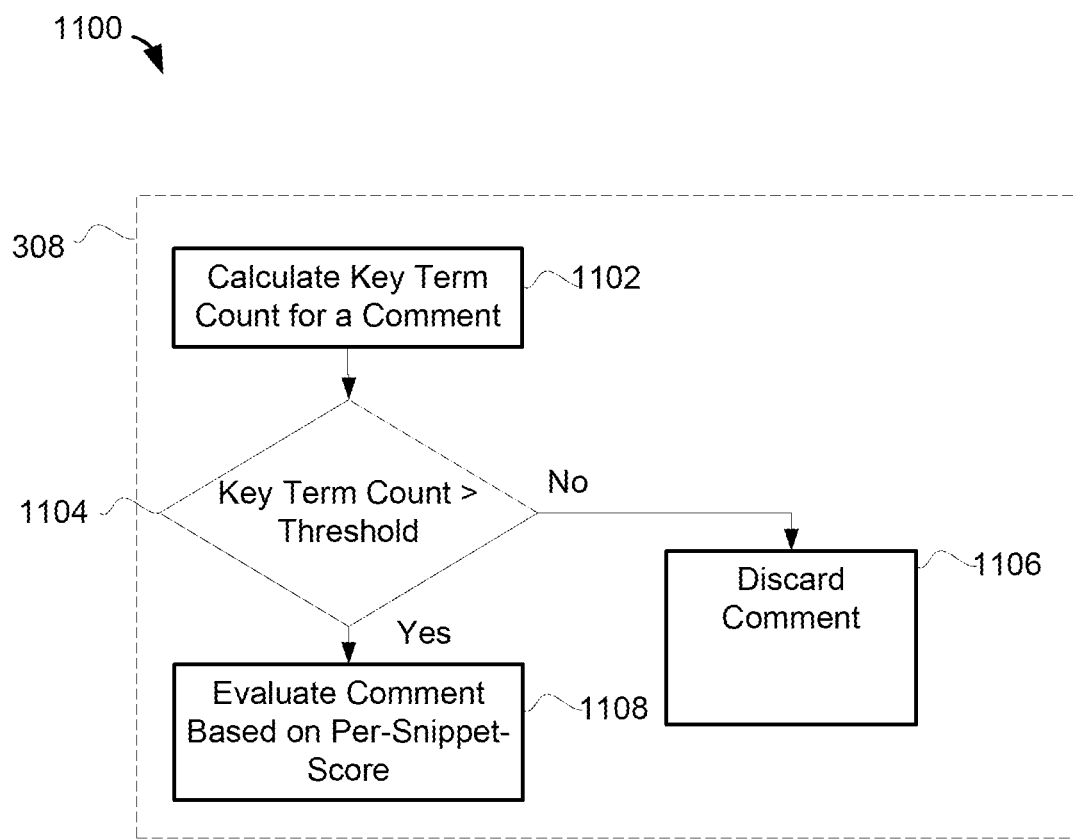
FIG. 11 is a flowchart of a method of validating potentially relevant comments in accordance with an embodiment of the present disclosure.

Referring now to FIG. 11, one such embodiment is illustrated. In FIG. 11, a method 1100 of validating potentially relevant comments is illustrated in flowchart form. The method 1100 may, in at least some embodiments, be performed at 308 of FIG. 3.

The method 1100 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor to perform the method 1100 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 1100 of FIG. 11.

The method 1100 may, in some embodiments, be performed for all comments which have been identified as being potentially relevant (i.e. all comments identified at 306 of FIG. 3).

At 1102, a key term count is calculated for a comment. The key term count is a measure of the number of terms in a comment which are key terms (i.e. the number of terms in the comment which are also terms which were identified as key terms in 304 of FIG. 3). In at least some embodiments, the key term count may be determined by counting the number of terms which appear in the comment and which also appear in the key terms.

At 1104, the comment association system 170 determines whether the key term count exceeds a key term threshold. That is, the comment association system 170 determines whether the comment contains a sufficient number of key terms. In at least some embodiments, the key term threshold may be a static integer, such as one (1). In other embodiments, the key term threshold may depend on the number of key terms that have been identified. For example, in at least some embodiments, the key term threshold may be a third of the number of key terms that have been identified.

In some embodiments, if the key term threshold for a comment is less than the key term threshold, then the comment may be discarded at 1106. That is, the comment association system 170 may determine that the comment is invalid (i.e. unrelated to the primary electronic document(s)). In least some embodiments, when the comment is determined to be invalid, it is not associated with the primary electronic document(s).

In some embodiments, if there are a sufficient number of key terms in the comment (i.e. if the key term count exceeds the key term threshold), then the comment may be evaluated based on a per-snippet-score (at 1108). More particularly, at 1108 the comment may be evaluated using the method 1000 discussed above with reference to FIG. 10.

In some embodiments, another relation measure may be used by the comment association system 170 to validate comments instead of or in addition to the relation measures discussed above. In at least some embodiments, the relation measure may be based on a measure of the similarity of the terms in the comments and the terms in the snippets. That is, if there are a large number of similar words in the snippet and the comment, then the comment may be determined to be more likely to be valid. That is, instead of only looking at the terms which are common between snippets and comments, the comment association system 170 may also look at terms which are similar between snippets and comments. Comments may be validated (i.e. determined to be related to primary electronic documents), if those comments and representative portion(s) of the primary electronic documents (such as the snippets) contain a large number of similar terms.

Figure 12:
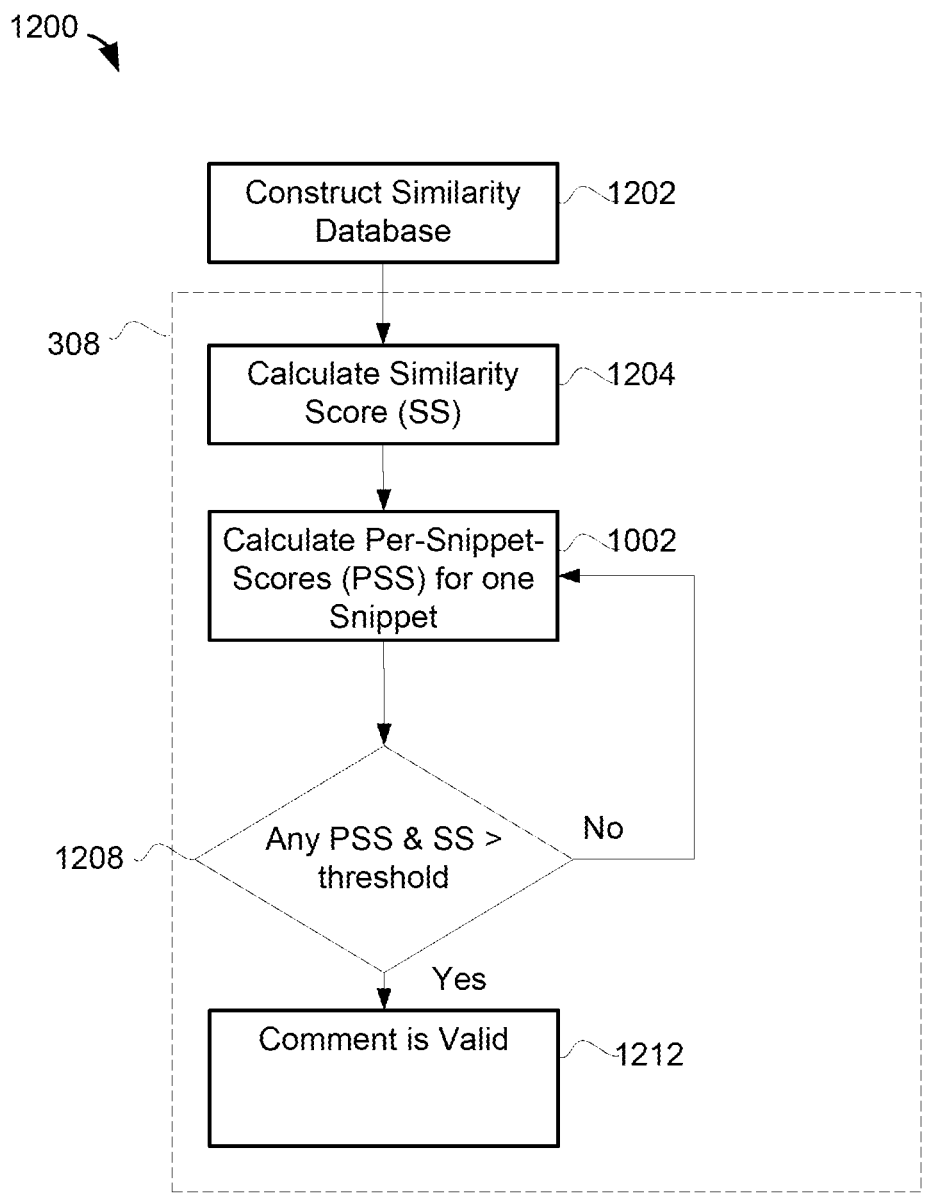
FIG. 12 is a flowchart of a method of validating potentially relevant comments in accordance with an embodiment of the present disclosure.

Referring now to FIG. 12, one such embodiment is illustrated. In FIG. 12, a method 1200 of validating potentially relevant comments is illustrated in flowchart form. At least some of the method 1200 may, in at least some embodiments, be performed at 308 of FIG. 3.

The method 1200 includes steps or operations which may be performed by the comment association system 170. In at least some embodiments, the comment association system 170 may include a memory 250 (or other computer readable storage medium) which stores computer executable instructions which are executable by one or more processor 240 and which, when executed, cause the processor 240 to perform the method 1200 or a portion thereof. In some example embodiments, these computer executable instructions may be contained in one or more module 260 such as, for example, the comment association module 232. That is, in at least some example embodiments, the comment association module 232 may contain instructions for causing the processor 240 to perform the method 1200 of FIG. 12.

At least a portion of the method 1200 may, in some embodiments, be performed for all comments 121 which have been identified as being potentially relevant (i.e. all comments identified at 306 of FIG. 3). For example, in some embodiments, the portion of the method 1200 which is numbered as 308 may be iteratively performed for each comment.

At 1202, a similarly database is constructed. The similarly database is, in at least some embodiments, constructed by parsing a large volume of electronic documents. The similarity database may be constructed, in some embodiments, well before the other steps of the method 1200 are performed. For example, in at least some embodiments, the similarity database may be constructed prior to any of the steps of method 300 of FIG. 3.

The similarity database is constructed by parsing a large volume of electronic documents (such as primary electronic documents and/or comments) to determine the likelihood that two terms are found together (i.e. in the same document). The similarity database specifies the likelihood of two terms being found together. That is, the similarity database quantifies the degree of similarity between pairs of terms.

Next, at 1204, for a given comment which has been identified as being potentially relevant, a similarly score for that comment 121 is determined. In some embodiments, the similarly score for a comment 121 may be determined as follows. First, in some embodiments, the comment association system may quantify the degree of similarity between the terms in a given comment and the terms in a given snippet. The comment association system 170 may do so, for example, by calculating a top similarity score between a comment and a snippet.

The top similarly score for a comment and snippet pair may be determined by determining the similarity scores between every term in that comment and every term in that snippet. The comment association system 170 may consult the similarity database to determine the similarity score for each term in the comment and each term in a snippet. That is, the comment association system 170 may determine how similar each word of the comment is to each word of the snippet by looking up these pairs of words in the similarity database. Next, the comment association system 170 may select the top similarity score for a given comment and snippet pair. The top similarity score is the highest similarly score between any word in a given comment and a given snippet.

Accordingly, for each snippet and comment pair, a top similarly score may be determined. This top similarly score may be added to the similarity score for the comment.

The similarly score for a comment may represent the number of similar terms between a comment and the snippets.

The comment association system 170 may also, at 1002, determine a measure of the number of words which are common between a comment and snippets. That is, in addition to determining the number of words that are similar, the comment association system 170 may also be interested in determining the number of words which are common between comments and snippets. Accordingly, in at least some embodiments, at 1002 a per-snippet-score may be determined for the comment and one of the snippets in the manner described above with reference to FIG. 10.

Next, at 1208, the comment association system 170 may determine whether the comment is valid based on the similarity score and the per-snippet-score. For example, if the sum of the similarity score for a comment and the per-snippet-score for any comment and snippet pair is greater than a threshold, then the comment association system 170 may determine that the comment is valid (at 1212). At 1208, the comment association system 170 verifies that the combined effect of the number of common terms in a comment and snippet and the number of similar terms in that comment and snippet suggests that the comment and snippet are related to the same subject matter.

If, however, the effect of the similarity score and the per-snippet score is not greater than the threshold, then the method 1200 may return to 1002 where another per-snippet-score may be calculated for another snippet (if there are any snippets which have not been used to calculate a per-snippet-score for that comment).

While the present disclosure describes methods, a person of ordinary skill in the art will understand that the present disclosure is also directed to various apparatus, such as a server and/or a document processing system (such as a comment association system 170), including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus and articles of manufacture also come within the scope of the present disclosure.

While the methods 300, 400, 500, 600, 700, 800, 900, 1000, 1100, 1200 of FIGS. 3 to 12 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of associating one or more comments with one or more primary electronic documents, the method comprising:

identifying, at a comment association system, one or more key terms from at least a portion of the one or more primary electronic documents;

identifying, at the comment association system, one or more comments associated with the identified key terms;

wherein identifying the one or more comments comprises:
  determining a measure of the likelihood of a key term and a marker being found together in a comment; and
  determining whether the measure of the likelihood of a key term and a marker being found together exceeds a predetermined threshold and if so, identifying comments containing the marker;

determining, at the comment association system, whether an identified comment is sufficiently related to the one or more primary electronic documents by calculating one or more relation score for that identified comment and comparing the one or more relation score to one or more threshold; and if the identified comment is sufficiently related to the one or more primary electronic documents, then associating the identified comment with the one or more primary electronic documents at the comment association system.

2. The method of claim 1, wherein the determining is performed for each identified comment.

3. The method of claim 1, wherein the one or more comments are micro-blog posts.

4. The method of claim 1, wherein identifying one or more key terms comprises:

obtaining a measure of an importance of each of a plurality of words in the primary electronic documents; and selecting one or more of the plurality of words as key terms based on the measures of importance.

5. The method of claim 4, wherein the measure of importance is a term frequency-inverse document frequency.

6. The method of claim 4 wherein identifying key terms further comprises, prior to obtaining a measure of the importance:

determining a part of speech for each of the identified words; and filtering out one or more of the identified words based on the part of speech for those identified words.

7. The method of claim 1, wherein the key terms include phrases.

8. The method of claim 1, wherein identifying one or more key terms comprises:

obtaining a measure of an importance of a plurality of terms in the primary electronic documents;

selecting one or more terms having a higher relative importance than other words as center terms and creating a group for each center term;

calculating one or more group relation measure of one of the terms in the primary electronic document which is not a center term to the center term, each group relation measure specifying the similarity between the term which is not a center term and one or more terms of the group;

selectively adding terms to one or more of the groups based on the one or more group relation measure;

calculating a group score for a plurality of the groups; and selecting, as key terms, terms from groups having a higher relative group score relative to other groups.

9. The method of claim 1, wherein the marker is a hash tag.

10. The method of claim 1, wherein at least one relation score is determined based on the number of common terms in the identified comment and a portion of one of the primary electronic documents.

11. The method of claim 10, wherein at least one relation score is determined based on the number of key terms which are in the identified comment.

12. The method of claim 10, wherein the at least one relation score is also determined based on the number of common terms which are key terms.

13. The method of claim 10, wherein the at least one relation score is also a determined based on a measure of the similarity of the terms in the comments and the terms in the portion of one of the primary electronic documents.

14. The method of claim 1, wherein the portion of the one or more primary electronic documents is a title of the primary electronic document.

15. A comment association system for associating one or more comments with one or more primary electronic documents, the comment association system comprising:
   a processor; and
   a memory coupled to the processor, the memory storing processor executable instructions which, when executed by the processor cause the processor to:
      identify one or more key terms from at least a portion of the one or more primary electronic documents;
      identify one or more comments associated with the identified key terms;
         wherein identifying the one or more comments comprises:
      determining a measure of the likelihood of a key term and a marker being found together in a comment; and
      determining whether the measure of the likelihood of a key term and a marker being found together exceeds a predetermined threshold and if so, identifying comments containing the marker;
      determine whether an identified comment is sufficiently related to the one or more primary electronic documents by calculating one or more relation score for that identified comment and comparing the one or more relation score to one or more threshold; and
      if the identified comment is sufficiently related to the one or more primary electronic documents, then associating the identified comment with the one or more primary electronic documents.

16. The comment association system of claim 15, wherein the processor executable instructions are configured to cause the processor to perform the determining for each identified comment.

17. The comment association system of claim 15, wherein the one or more comments are micro-blog posts.

18. The comment association system of claim 15, wherein identifying one or more key terms comprises:
   obtaining a measure of an importance of each of a plurality of words in the primary electronic documents; and
   selecting one or more of the plurality of words as key terms based on the measure of importance.

19. The comment association system of claim 18, wherein the measure of importance is a term frequency-inverse document frequency.

20. The comment association system of claim 18, wherein identifying key terms further comprises, prior to obtaining a measure of the importance:
   determining a part of speech for each of the identified words; and
   filtering out one or more of the identified words based on the part of speech for those identified words.

21. The comment association system of claim 15, wherein the key terms include phrases.

22. The comment association system of claim 15, wherein identifying one or more key terms comprises:
   obtaining a measure of an importance of a plurality of terms in the primary electronic documents;
   selecting one or more terms having a higher relative importance than other words as center terms and creating a group for each center term;
   calculating one or more group relation measure of one of the terms in the primary electronic document which is not a center term to the center term, each group relation measure specifying the similarity between the term which is not a center term and one or more terms of the group;
   selectively adding terms to one or more of the groups based on the one or more group relation measure;
   calculating a group score for a plurality of groups; and
   selecting, as key terms, terms from groups having a higher relative group score relative to other groups.

23. The comment association system of claim 15, wherein the marker is a hash tag.

24. The comment association system of claim 15, wherein the processor executable instructions are configured to cause the processor to determine at least one relation score based on the number of common terms in the identified comment and a portion of one of the primary electronic documents.

25. The comment association system of claim 24, wherein the processor executable instructions are configured to cause the processor to determine at least one relation score based on the number of key terms which are in the identified comment.

26. The comment association system of claim 25, wherein the at least one relation score is also determined based on the number of common terms which are key terms.

27. The comment association system of claim 24, wherein the processor executable instructions are configured to cause the processor to determine at least one relation score based on a measure of the similarity of the terms in the comments and the terms in the portion of one of the primary electronic documents.

28. The comment association system of claim 15, wherein the portion of the one or more primary electronic documents is a title of the primary electronic document.

* * * * *